Dec. 2, 1969  J. C. HUGHES ET AL  3,481,317
CATALYTIC IGNITION SUSTAINING APPARATUS IN AN OTTO CYCLE ENGINE
Filed Jan. 3, 1968
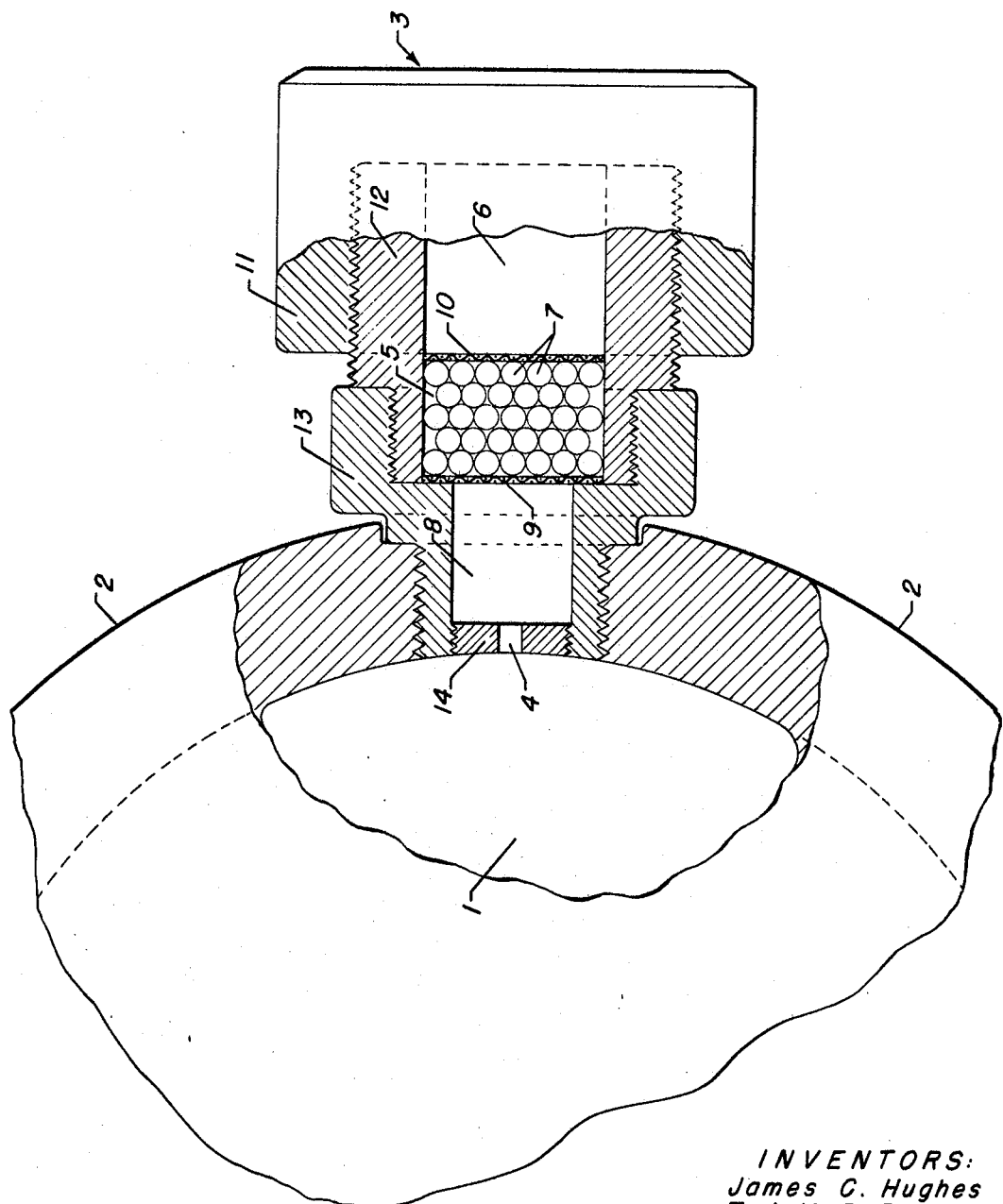
INVENTORS:
James C. Hughes
Ted V. DePalma
BY: James R. Hoatson, Jr.
Philip T. Liggett
ATTORNEYS United States Patent Office 3,481,317
Patented Dec. 2, 1969

3,481,317
CATALYTIC IGNITION SUSTAINING APPARATUS
IN AN OTTO CYCLE ENGINE
James C. Hughes, Terrell, Tex., and Ted V. De Palma,
Roselle, Ill., assignors to Universal Oil Products Company, Des Plaines, Ill., a corporation of Delaware
Filed Jan. 3, 1968, Ser. No. 695,390
Int. Cl. F02p 23/02
U.S. Cl. 123—143                                              6 Claims

ABSTRACT OF THE DISCLOSURE

An improved ignition sustaining unit which effects periodic ignition of an air-fuel mixture in an Otto cycle engine. Ignition is effected by isolating a small quantity of air-fuel mixture from the combustion chamber, and more particularly, by passing a small quantity of air-fuel mixture through a catalyst in the ignition sustaining unit, and returning the resulting burning mixture to the combustion chamber, where the balance of the mixture is ignited.

---

The present invention relates to an improved form of an ignition sustaining unit in an Otto cycle engine, which periodically effects ignition of an air-fuel mixture. Ignition is effected by isolating a portion of an air-fuel mixture from a combustion chamber in an Otto cycle engine, passing this portion of mixture into the ignition sustaining unit which contains a catalyst, and returning the resulting burning mixture to the combustion chamber. The balance of the mixture in the combusition chamber is thereby ignited. The present invention is directed to an improved apparatus which effects the aforesaid isolation, catalytic burning, and return of the burning mixture to the combustion chamber, that is, the aforesaid ignition sustaining unit.

The current state of the art is such that in most Otto cycle engines a spark plug is used as a fuel ignition means. In this arrangement, a spark plug periodically initiates the combusition of an air-fuel mixture within a combusition chamber communicating with a cylinder, by arcing an electric current therein, thus igniting said air-fuel mixture, the resultant expansion of gases effecting the power stroke of the piston within said cylinder. The combustion chamber, in an Otto cycle engine, is conventionally equipped with a fuel inlet means and an exhaust outlet means, in communication with the cylinder. The entire apparatus is encased in an engine housing, which is constructed of a heavy metal to withstand the repeated shock of combustion within the combusition chamber. An Otto cycle engine generally must be started with an electric motor, or some similar apparatus which turns the crank shaft thereby setting in motion the mechanisms which allow the introduction of air and fuel into the combustion chamber, close the inlet and outlet means, compress the air-fuel mixture, and allow the spark plugs to fire. The motion of the piston which is created by the expanding gases then operates all the necessary mechanisms to remove the exhaust gases from the combustion chamber and cylinder and initiate another cycle.

Spark plugs have serious limitations and disadvantages when used to effect continued periodic firing. One problem is that the electrodes across which an electric spark arcs on a spark plug, tend to collect residue from burned and unburned fuel. Also, the firing of the fuel by the spark plug burns away the metal at the electrodes so as to alter the distance the arc must travel. Both the build-up of residue and the burning away of the electrodes lowers the efficiency of the spark plug which results in an arc which does not effect the maximum burning at a minimum voltage requirement. Furthermore, a spark plug is operated by an electric current, which requires a high voltage electrical system, the proper function of which is absolutely vital in order for the engine to perform properly. An extremely high voltage is required to operate engines using very lean mixtures, such as stratified charge engines. In these situations, the voltage required may be four or five times greater than that required in engines operating with conventional air-fuel ratios. Due to the above mentioned disadvantages, replacement of spark plugs is frequently necessary, which is a limitation of using spark plugs as a fuel ignition means.

Other devices have been used to effect combustion of an air-fuel mixture, but they also have certain disadvantages. The provision of a cavity extending into the engine housing from the combustion chamber or cylinder has been utilized to some extent in igniting an air-fuel mixture. This has proved only moderately successful, however, and then only with heavier fuels, such as diesel fuel. The disadvantages of such system is that this type of ignition device does not become effective until the engine has operated for quite some time on a conventional electrical system. This undesirable aspect is most pronounced at low speeds and light loads.

The object of our invention is, in an Otto cycle engine, to provide a means for sustaining periodic ignition of an air-fuel mixture which requires no power source nor method of power transmission, apart from the mechanical features of the engine itself. Another object is to provide an ignition sustaining unit which is not subject to deterioration from the effects of combustion of the air-fuel mixture within the combustion chamber. Our invention is particularly useful when used to ignite a "lean" air-fuel mixture, that is, an air-fuel mixture in which the ratio of air to fuel is substantially greater than 12:1 by weight. This is so because while an electrical ignition means requires excessively high voltage to ignite such a mixture, no variance from normal construction is required in our invention. Also, our improved ignition sustaining unit, when starting, will become self-sustaining after only a few cycles of the engine operating under conventional electrical system. Our ignition sustaining unit is designed to require no repairs and is designed to encounter no deteriorative effects from prolonged operation. The ignition sustaining unit may be designed to be readily removable from communication with the combustion chamber. This is desirable since it has been found that engines of different design require different dimensioned ignition sustaining units in order for the ignition sustaining unit to achieve its optimum performance. Thus, many changes of ignition sustaining units may easily be made if the ignition sustaining units are designed to be interchangeable and readily removable from the engine.

Since our ignition sustaining unit is not self-starting it can be used most advantageously when the engine is to be run continuously over a long period of time. One such use would be aircraft driven by Otto cycle engines, i.e.; propeller driven airplanes and helicopters. An additional advantageous use of our invention in these situations is that of an alternative ignition system, where regulations require two separate ignition systems on an aircraft. Since our invention operates on an entirely different principle than other ignition systems, it is not susceptible to the same malfunctions as are conventional ignition systems.

Our invention may be used in any Otto cycle engine, whether it be used with automobiles, trucks, airplanes, pumps, lawnmowers, motorcycles, air compressors, construction equipment, nautical vessels, or any other applications of Otto cycle engines.

In a broad aspect our invention is, in a conventional Otto cycle engine comprising in part an engine housing, at least one cylinder in turn having a piston, combustion chamber, fuel ignition means, exhaust outlet means, and starting means, the improvement which comprises at least one ignition sustaining unit in turn comprising an orifice, a catalyst chamber, and an ignition cavity, said orifice communicating with said combustion chamber, whereby a portion of an air-fuel mixture passes from said combustion chamber under pressure, through said orifice, through said catalyst chamber, to said ignition cavity, where said portion of air-fuel mixture is catalytically ignited, the pressure resulting from such ignition forcing the burning mixture back through said catalyst chamber, through said orifice and back into said combustion chamber where the balance of said air-fuel mixture is ignited.

Any catalyst which will promote the desired combustion may be used. When commercial grade gasoline is used in an Otto cycle engine, the temperatures and pressures existing therein are sufficient to effect catalytic ignition, after ignition has once been initiated in the engine. Normally temperatures much greater than required for ignition will develop in an engine. However, due to the construction of our invention, our ignition sustaining unit may be kept cooled below a temperature at which physical changes in the catalyst take place, such as melting or crystallization. This can be done by cooling only the ignition sustaining unit without reducing the temperatures surrounding the engine.

Two catalysts which have been used successfully in the ignition sustaining unit in the combustion of commercial grade gasoline are a catalyst comprising 10.38% silver by weight on a silica support, and a catalyst comprising 3 0% platinum on silica-alumina bead support. While any catalysts may be used which effect the combustion of the fuel used in engine, the preferred arrangement is a solid catalyst or a catalyst mounted on a solid support. In this preferred arrangement, the catalyst chamber is porous to the passage of the fuel. This is accomplished by mounting the catalyst on supports which when compacted, are previous to the fuel flow, and by enclosing the catalyst chamber with porous screens, whereby the fuel may pass in either direction through the catalyst chamber, but the catalyst is retained within the chamber. The alternative to the preferred arrangement is the use of an injected catalyst and different paths of travel for the incoming air-fuel mixture and for the outgoing burning mixture.

The ignition cavity must be in communication with the catalyst chamber. The function of the ignition cavity is to provide a space for the fuel to expand as the fuel combines catalytically with oxygen in the air-fuel mixture, whereby preventing the burning fuel from being forced prematurely back into the combustion chamber of the engine thereby igniting the balance of the air-fuel mixture while the inlet valve for the air-fuel mixture is still open. Conversely, the ignition cavity should not be so large as to contain the burning air-fuel mixture beyond the optimum time for igniting the air-fuel mixture in the engine combustion chamber. While relative dimensions vary with different engines, the cross-sectional area of the ignition cavity is, generally, at least as great as that of the catalyst chamber.

The orifice in the ignition sustaining unit governs the amount of air-fuel mixture which is admitted to the ignition sustaining unit. The optimum size of the orifice depends upon the engine used, the fuel used, the air-fuel ratio and the size of the ignition cavity in the ignition sustaining unit. The orifice, which generally limits the amount of air-fuel mixture flowing into the catalyst chamber, is usually smaller than the cross-sectional area of the catalyst chamber.

In all cases, the particular orifice size, the catalyst chamber size and the ignition cavity size must be correlated to suit a given engine operating on a given fuel with a specific range of air-fuel ratio. For this reason, it is preferable that the individual components of the ignition sustaining unit be designed to be interchangeable. This is accomplished by constructing the ignition sustaining unit housing in several parts, each part of the housing enclosing either all or part of an orifice, a catalyst chamber, or an ignition cavity. Preferably, these several parts of the housing are constructed so that the housing for any ignition cavity will fit and attach to the housing of any catalyst chamber. The housing of any catalyst chamber, likewise, will fit and attach to the housing for any orifice. In the same manner, the housing of any orifice will fit and attach to a certain size hole in the engine housing which leads to the engine combustion chamber for each cylinder with which the sustaining unit is to be used. The simplest method of achieving this modular design in the parts comprising the ignition sustaining unit is by matching male and female threads on the various appropriate housing parts for the components of the ignition sustaining unit. This construction can likewise be extended to make all the ignition sustaining units interchangeable with the engine cylinders with which they may be used. Such a modular design of parts has the added advantage of providing access to the catalyst chamber for the purpose of replenishing or replacing the catalyst or the other parts of the igntion sustaining unit.

The performance of our invention can be further illustrated. Our invention is an ignition sustaining unit used with a conventional Otto cycle engine, said engine comprising in part an engine housing, a crankshaft, at least one cylinder, each cylinder in turn having a piston, a combustion chamber, a fuel ignition means, an air-fuel means, an exhaust outlet means, and a starting means. The fuel ignition means may be comprised of a spark plug connected to an appropriate electric power source, which may be the engine itself. The inlet and outlet means may be valves operated by a camshaft which is synchronized to the crankshaft of the engine. The starting means may be a battery operated motor which turns the crankshaft thus starting the operation of the engine. Once the engine has been started and fuel has been ignited in the combustion chamber, ignition is sustained with the ignition sustaining unit. The fuel ignition means may then be rendered inoperative, if desired, although its continued operation does not impede the performance of the ignition sustaining unit. When the ignition sustaining unit is in operation, fuel enters the combustion chamber while the air-fuel inlet means is opened and while the downstroke of the piston assists in drawing in the air-fuel mixture. When the piston starts back up the cylinder, all valves are closed and a portion of the air-fuel mixture is forced through the orifice into the ignition sustaining unit by the increasing pressure of the piston compressing the air-fuel mixture within the cylinder and combustion chamber. As the air-fuel mixture enters the ignition sustaining unit, it passes through the orifice, through the catalyst chamber, then is catalytically ignited as it reaches the ignition cavity. The ignition and resulting combustion of the air-fuel mixture within the ignition cavity increase the pressure within the ignition cavity and when the piston reaches the top of its stroke and ceases to force the air-fuel mixture into the ignition sustaining unit, the pressure in the ignition cavity forces the burning air-fuel mixture back through the catalyst chamber, through the orifice and into the combustion chamber, where this burning mixture ignites the balance of the air-fuel mixture causing combustion and expansion thereof, thus forcing the piston down into its power stroke. The ensuing return stroke expels the exhaust gases and the cycle is repeated.

The various features of the apparatus of our invention are illustrated in one embodiment in the accompanying drawing, which is a cross-sectional plan view of the ignition sustaining unit as it communicates with an engine combustion chamber. Referring now to the drawing, the air-fuel mixture enters the combustion chamber 1 of an engine, said combustion chamber 1 being in communication with a cylinder (not shown). Communicating with combustion chamber 1 through a threaded hole in engine housing 2 is ignition sustaining unit 3. Ignition sustaining unit 3 comprises orifice 4, catalyst chamber 5, and ignition cavity 6. A portion of the air-fuel mixture enters ignition sustaining unit 3 from combustion chamber 1 during the compression stroke of the engine piston (not shown). During this stroke the air-fuel mixture is forced into ignition sustaining unit 3 through orifice 4. Once past orifice 4, the air-fuel mixture passes through a passageway 8, through a porous screen 9, and into catalyst chamber 5, wherein is located the catalyst mounted on refractory inorganic oxide supports 7. During its passage through catalyst chamber 5 and upon emerging from porous screen 10, the air-fuel mixture ignites in ignition cavity 6. As the burning fuel expands, it fills ignition cavity 6, and when the rate of increase of pressure from the combustion chamber 1 subsides, the pressure in ignition cavity 6 forces the burning fuel back through screen 10, catalyst chamber 5, screen 9, passageway 8, and out orifice 4 into combustion chamber 1, where the burning fuel ignites the balance of the fuel in combustion chamber 1. The air-fuel mixture in combustion chamber 1 burns when ignited and the resulting products of combustion then expand into the cylinder and force the piston into its power stroke. The ignition sustaining unit housing parts 14, 13, 12, and 11 are all shaped in the form of discs, cylinders, or a combination thereof, and fit and are attached together and to the engine housing 1 by matching threads. The pitch and the threads per unit length of the corresponding threads are the same for different ignition sustaining units, although the dimensions of the ignition cavity, catalyst chamber, and orifice may vary. In the embodiment shown, the orifice 4 is of smaller cross-sectional area than is catalyst chamber 5, and catalyst chamber 5 is of the same cross-sectional area as is ignition cavity 6, while the axial length of ignition cavity 6 is greater than its diameter.

As an example of the order of magnitude of the ignition sustaining unit as used in a cylinder of an automobile engine, one ignition sustaining unit was constructed with a circular orifice having a diameter of 0.0625 inch and a catalyst chamber and ignition cavity, both of circular cross-section, having a diameter of 0.25 inch. The ignition cavity had an axial length of one inch.

We claim as our invention:

1. In a conventional Otto cycle engine comprising in part an engine housing and at least one cylinder in turn having a piston, combustion chamber, fuel ignition means, exhaust outlet means, and starting means, the improvement which comprises at least one ignition sustaining unit in turn comprising an orifice, a catalyst chamber having a one end and another end, and an enclosed ignition cavity, said orifice continuously connecting said one end of the catalyst chamber with said combustion chamber, and said ignition cavity being adjacent to and in continuous open fluid communication with said other end of the catalyst chamber, whereby a portion of an air-fuel mixture passes from said combustion chamber under pressure, through said orifice, through said catalyst chamber, to said ignition cavity, where said portion of air-fuel mixture is catalytically ignited, the pressure resulting from such ignition forcing the burning mixture back through said catalyst chamber, through said orifice and back into said combustion chamber where the balance of said air-fuel mixture is ignited.

2. The apparatus of claim 1 further characterized in that said orifice is of smaller cross-sectional area than is said catalyst chamber.

3. The apparatus of claim 2 further characterized in that the cross-sectional area of said ignition cavity is at least as great as that of said catalyst chamber.

4. The apparatus of claim 3 further characterized in that said orifice is circular having a diameter of 0.0625 inch and said catalyst chamber and said ignition cavity are both of circular cross-section and having a diameter of 0.25 inch and said ignition cavity has an axial length of one inch.

5. The apparatus of claim 1 further characterized in that said ignition sustaining unit communicates with said combustion chamber by insertion of said ignition sustaining unit in a hole in said engine housing leading to said combustion chamber.

6. The apparatus of claim 5 further characterized in that said ignition sustaining unit and the hole in said engine housing are both threaded, whereby said ignition sustaining unit is fastenable to said engine.

References Cited

UNITED STATES PATENTS

| 1,203,073 | 10/1916 | Stringham | 123—143 |
| 1,622,871 | 3/1927 | Barbarou | 123—143 |

LAURENCE M. GOODRIDGE, Primary Examiner

U.S. Cl. X.R.

123—30